March 31, 1925.

D. T. McNIEL

FRUIT DRIER

Filed July 24, 1922

1,531,865

Inventor

Daniel T. McNiel

Patented Mar. 31, 1925.

1,531,865

UNITED STATES PATENT OFFICE.

DANIEL T. McNIEL, OF DETROIT, MICHIGAN.

FRUIT DRIER.

Application filed July 24, 1922. Serial No. 577,149.

*To all whom it may concern:*

Be it known that I, DANIEL T. McNIEL, a citizen of the United States of America, residing at Detroit, in the county of Wayne and State of Michigan, have invented certain new and useful Improvements in Fruit Driers, of which the following is a specification, reference being had therein to the accompanying drawings.

This invention relates to drying machines and particularly to machines employing compressed air as the drying medium.

An object of the invention is to provide a simple and efficient machine for removing moisture from the surface and pores of the citrous fruit after the same has been washed so that there will be no dampness when packing for shipment.

Another object of the invention is to provide a practical machine for subjecting the fruit to the action of expanding air while being conveyed upon an endless carrier from a washing apparatus to a sorting or grading table.

Another object is to provide a machine for rapidly drying the entire surface of the fruit while in transit without the necessity of changing the position of the fruit upon the endless carrier.

Another object is to provide a light and durable apparatus which can be manufactured at a comparatively low cost.

With the above and other objects in view the invention consists in certain novel features of construction, combination and arrangement of parts as will be more fully described and particularly pointed out in the appended claims.

Figure 1:
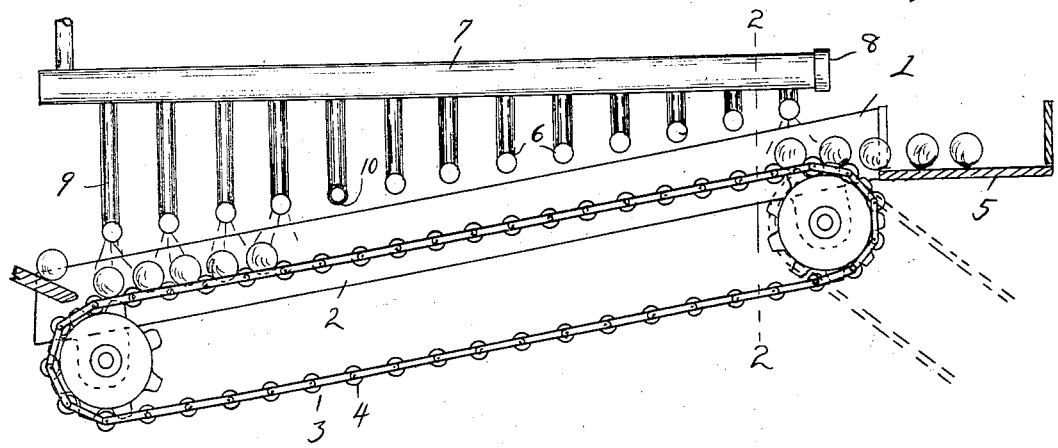
Figure 1 is a side elevation of my invention and shows parts in elevation.
Figure 2:
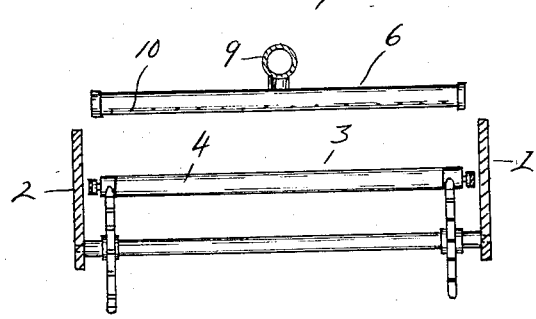
Figure 2 is a sectional view taken on line 2—2 of Figure 1.

Referring now to the drawing in which like characters of reference designate corresponding parts throughout the several views, numeral 1 designates an inclined frame including a pair of parallel bars 2. An endless carrier 3 is movable between the bars 2 of the frame and includes a plurality of rollers 4 which are spaced apart a predetermined distance so that the fruit will not fall therebetween while in transit. The endless carrier is adapted to convey the fruit from a suitable washing apparatus (not shown) to a sorting or grading table 5 adjoining the upper end of the frame.

While in transit the citrous fruit is subjected to the action of air which has been under pressure through a series of tubes 6 obtaining their supply from a common trunk 7 which receives its air supply at one end from a suitable source (not shown). The opposite end of the trunk is closed as shown at 8. The trunk 7 as shown is in the form of an enlarged horizontally disposed pipe arranged above and extending longitudinally of the inclined frame and endless carrier. The tubes are in the form of horizontal pipes extending transversely of the frame and are connected to the trunk by means of an equal number of vertical conduits 9 which diminish in length from the lower end of the frame to the upper end thereof so that each tube will be spaced the same distance from the endless carrier and the discharge of air will be the same upon the fruit along the entire length of the carrier. Each tube is closed at its opposite ends and is provided throughout its length with a plurality of spaced openings 10.

These openings extend along a line at the bottom of each tube and also extend along two lines which are located a slight distance up the opposite sides of each tube. The openings upon one side of each tube direct the air to the bottom of approaching fruit and then up and over the fruit as it passes. The openings in the bottom of each tube direct the air against the adjacent side of the approaching fruit then up over the top and down the opposite side thereof as it passes. The openings in the opposite side of each tube direct the air against the top of the fruit as it passes and then down to the bottom thereof. The arrangement is such that the fruit while being conveyed upon the endless carrier beneath the tubes is constantly subjected to air discharged through the openings in at least two lines.

The frame is devoid of a bottom so that air discharged from the tubes is free to pass down between the rollers 4 of the endless carrier and will carry off all moisture removed from the surface of the fruit.

The velocity of air discharged through the tube is such that the moisture upon the surface of the fruit if in drops is blown off and the remaining moisture is broken up into small particles and is quickly removed or evaporated. Expansion occurs after the compressed air is discharged through the openings in the tubes and this action of the air completes the evaporation of the moisture for the reason that expanding compressed air is relatively dry or low in humidity which enables it to cool the fruit and absorb rapidly the moisture upon the surface of the fruit.

The drying apparatus occupies no extra floor space as it is placed immediately above the carrier on which the fruit to be dried is conveyed.

While it is believed that from the forgoing description the nature and advantages of the invention will be readily apparent, I desire to have it understood that I do not limit myself to what is herein shown and described, and that such changes may be resorted to when they fall within the scope of what is claimed.

What I claim as my invention is:

1. In a drying machine, the combination with a frame and a movable carrier carried by said frame for supporting the articles to be dried, of a plurality of tubes disposed above said carrier and extending transversely of said frame said tubes having jets arranged in spaced lines for subjecting the articles upon said carrier to the action of diverging streams of expanding compressed air, said frame being devoid of a bottom and top, and means for supplying compressed air to said tubes.

2. In a drying machine, the combination with a frame and a movable inclined carrier carried by said frame for supporting the articles to be dried, of a plurality of tubes extending transversely of said carrier for subjecting the articles upon said carrier to the action of expanding air, a trunk extending longitudinally of said frame for supplying air under pressure to said tubes, and a plurality of vertical pipes connecting said trunk and tubes, said pipes diminishing in length from one end of said trunk to the other, whereby each of said tubes are spaced equally from said inclined carrier.

3. In a drying machine, the combination with a frame and a movable carrier carried by said frame for supporting the articles to be dried, of a plurality of tubes located above and extending transversely of said frame, said tubes being closed at their opposite ends and having a plurality of openings formed therein, said openings extending along lines arranged upon opposite sides and in the bottom of each tube, a plurality of pipes extending upwardly from the tubes aforesaid, and a trunk connected to said pipes for supplying air under pressure to the first mentioned pipes.

4. In a drying machine, the combination with a support for articles to be dried, of a series of tubes disposed upon one side of said support, means for supplying air under pressure to said tubes, said tubes having apertures arranged in spaced lines for discharging diverging streams of air against the articles upon said support.

5. In a drying machine, the combination with a support for the articles to be dried, of a series of tubes disposed upon one side of said support, each tube having means for discharging a drying medium simultaneously in two or more directions against the articles upon said support.

6. In a drying machine, the combination with a support for articles to be dried, of means above the support for directing diverging streams of a drying medium against the articles upon the support.

7. In a drying machine, the combination with an inclined endless carrier for conveying the articles to be dried, of spaced means disposed above said carrier for directing diverging streams of expanding compressed air against the articles on said carrier.

8. The method of drying citrous fruit consisting of absorbing moisture from the surface and pores of the fruit by subjecting the same to the action of cool expanding compressed air.

9. In a drying machine, the combination with a support for the articles to be dried, of a plurality of tubes disposed above the said support having jets arranged in spaced lines for directing a drying medium in diverging streams toward the articles on said support, and means for supplying a drying medium to said tubes.

10. In a drying machine, the combination with an inclined support for the articles to be dried, of a plurality of tubes extending transversely of said support having discharge orifices in spaced lines for directing a drying medium in diverging streams toward the articles on the support, and means for supplying a drying medium to said tubes, said tubes being arranged in a plane substantially parallel to the plane of said support.

11. In a drying machine, the combination with an inclined support for the articles to be dried, of a plurality of horizontal tubes extending transversely of said support having discharge orifices arranged in spaced lines for directing a drying medium in diverging streams toward the articles on the support, said tubes being arranged in a plane substantially parallel to the plane of said support, and means for supplying a drying medium to said tubes including a horizontal trunk extending transversely of said tubes, and upright tubes connecting said horizontal trunk to the horizontal tubes aforesaid.

In testimony whereof I affix my signature.

DANIEL T. McNIEL.